US012783838B2

(12) United States Patent
Suzuki

(10) Patent No.: US 12,783,838 B2
(45) Date of Patent: Nov. 3, 2026

(54) IMAGE RECORDING APPARATUS AND METHOD FOR RECORDING AN IMAGE, GENERATING FIRST PERIOD TO CONTROL DRIVING CONTROL CIRCUIT AND POWER-SAVING MODE

(71) Applicant: CANON KABUSHIKI KAISHA, Tokyo (JP)

(72) Inventor: Takumi Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/643,285

(22) Filed: Apr. 23, 2024

(65) Prior Publication Data

US 2024/0362446 A1 Oct. 31, 2024

(30) Foreign Application Priority Data

Apr. 25, 2023 (JP) ................................ 2023-071898

(51) Int. Cl.

| | |
|---|---|
| ***G06K 15/00*** | (2006.01) |
| ***G06K 15/10*** | (2006.01) |
| *G06F 3/12* | (2006.01) |

(52) U.S. Cl.

CPC ....... *G06K 15/4055* (2013.01); *G06K 15/102* (2013.01); *G06K 15/408* (2013.01); *G06F 3/1221* (2013.01)

(58) Field of Classification Search

None

See application file for complete search history.

(56) References Cited

U.S. PATENT DOCUMENTS

| | | | | |
|---|---|---|---|---|
| 7,389,431 B2 * | 6/2008 | Ohara | G06F 1/3215 | 713/340 |
| 2004/0125399 A1 * | 7/2004 | Kobayashi | G06F 1/3203 | 358/1.14 |
| 2007/0076272 A1 * | 4/2007 | Miyabayashi | B41J 2/16517 | 358/1.14 |
| 2007/0092278 A1 * | 4/2007 | Matsuda | G03G 15/2039 | 399/69 |
| 2009/0051958 A1 * | 2/2009 | Ito | G06F 3/1286 | 358/1.14 |
| 2016/0350636 A1 * | 12/2016 | Kawajiri | G06K 15/4055 | |

FOREIGN PATENT DOCUMENTS

JP 2013018238 A 1/2013

* cited by examiner

*Primary Examiner* — Haris Sabah

(74) *Attorney, Agent, or Firm* — Canon U.S.A., Inc. IP Division

(57) ABSTRACT

An image recording apparatus includes a driving control circuit configured to record an image on a recording medium, and a timer configured to generate a first period to control the driving control circuit, wherein the timer is configured to generate a second period that is different from the first period, and wherein, in a power-saving mode that uses less power than a normal mode in which an image is recorded, the timer is configured to measure time based on the second period.

11 Claims, 6 Drawing Sheets

IMAGE RECORDING APPARATUS AND METHOD FOR RECORDING AN IMAGE, GENERATING FIRST PERIOD TO CONTROL DRIVING CONTROL CIRCUIT AND POWER-SAVING MODE

BACKGROUND

Field of the Disclosure

The present disclosure relates to an image recording apparatus that performs recording on recording paper, and especially relates to an apparatus that measures time during a power-saving mode.

Description of the Related Art

In an existing inkjet-type recording apparatus that ejects ink from a head, there is a case where a nozzle of the head becomes clogged with the elapse of a long period of time during which the recording apparatus has not ejected ink. To address this issue, in a case where the power-saving mode, in which a recording operation implemented by ink ejection is not performed, lasts for a long period of time, for example, recovery processing to forcibly eject ink is preferably executed according to elapsed time. Under the circumstances, as a time measuring means during the power-saving mode, known is a configuration of measuring time using a timer arranged inside an application-specific integrated circuit (ASIC) (Japanese Patent Application Laid-Open No. 2013-18238).

SUMMARY

According to an aspect of the present disclosure, an image recording apparatus includes a driving control circuit configured to record an image on a recording medium, and a timer configured to generate a first period to control the driving control circuit, wherein the timer is configured to generate a second period that is different from the first period, and wherein, in a power-saving mode that uses less power than a normal mode in which an image is recorded, the timer is configured to measure time based on the second period.

According to another aspect of the present disclosure, a method of controlling an image recording apparatus includes performing driving to record an image on a recording medium, generating a first period to control the driving, and generating, in a power-saving mode that uses less power than a normal mode in which an image is recorded, a second period that is different from the first period and measuring time based on the second period.

Further features of various embodiments will become apparent from the following description of exemplary embodiments with reference to the attached drawings.

DESCRIPTION OF THE EMBODIMENTS

Exemplary embodiments of the present disclosure will be described in detail below with reference to the drawings.

Figure 1:
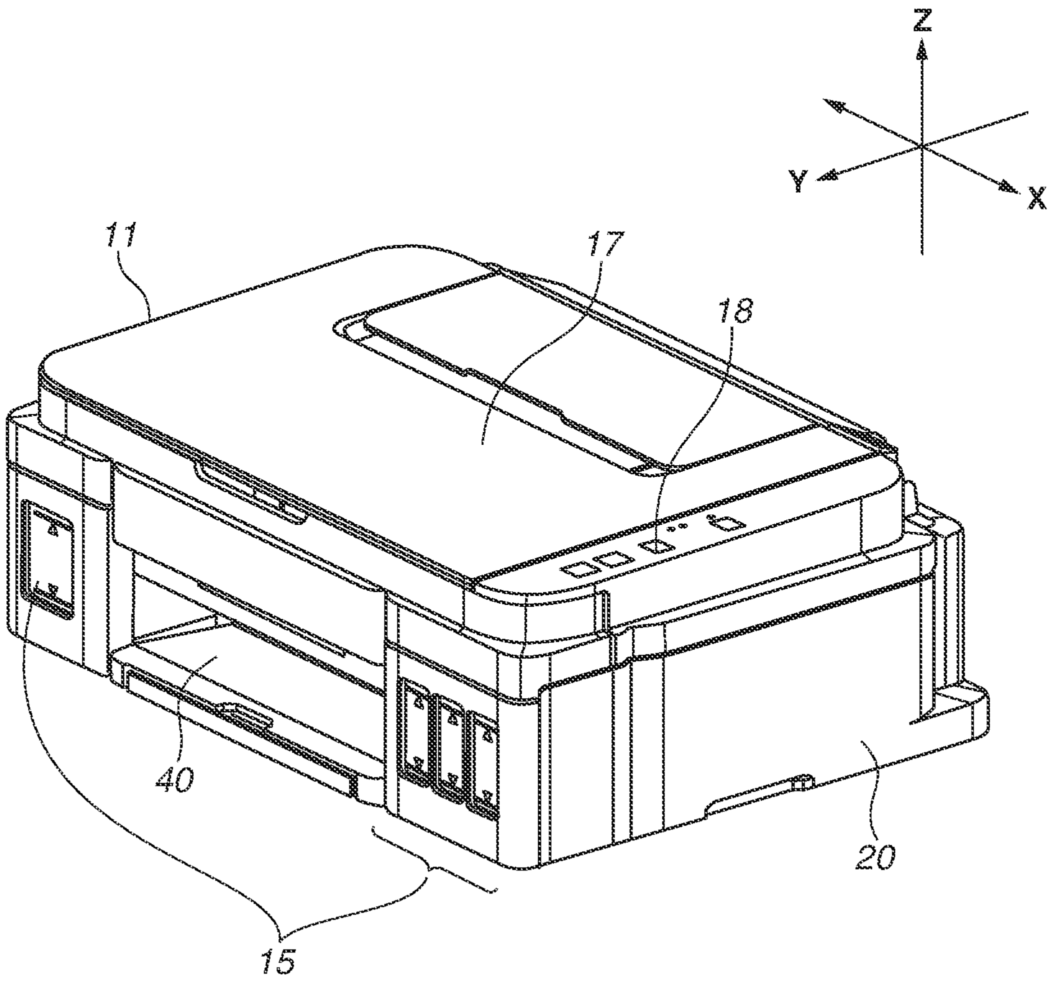
FIG. 1 is a perspective view illustrating an outer appearance of an image recording apparatus according to a first exemplary embodiment.

A first exemplary embodiment is now described. FIG. 1 is an outer appearance perspective view illustrating an outline of an image recording apparatus (hereinafter referred to as a recording apparatus) 11. The recording apparatus 11 is, for example, an inkjet-type recording apparatus.

The recording apparatus 11 includes, as illustrated in FIG. 1, a housing 20 and an ink tank 15 that contains ink used for recording on a recording medium. The ink tank 15 is arranged on one end side of the housing 20 in a Y-direction. On an upper side of the housing 20 in a Z-direction, the recording apparatus 11 includes a scanner unit 17 that performs an operation of reading a document, and an operation input unit 18, with which a user can perform an operation, such as input of a command. On the same side of the ink tank 15 in the Y-direction, the recording apparatus 11 includes a discharge unit 40, to which a recording medium that has undergone recording is discharged.

Figure 2:
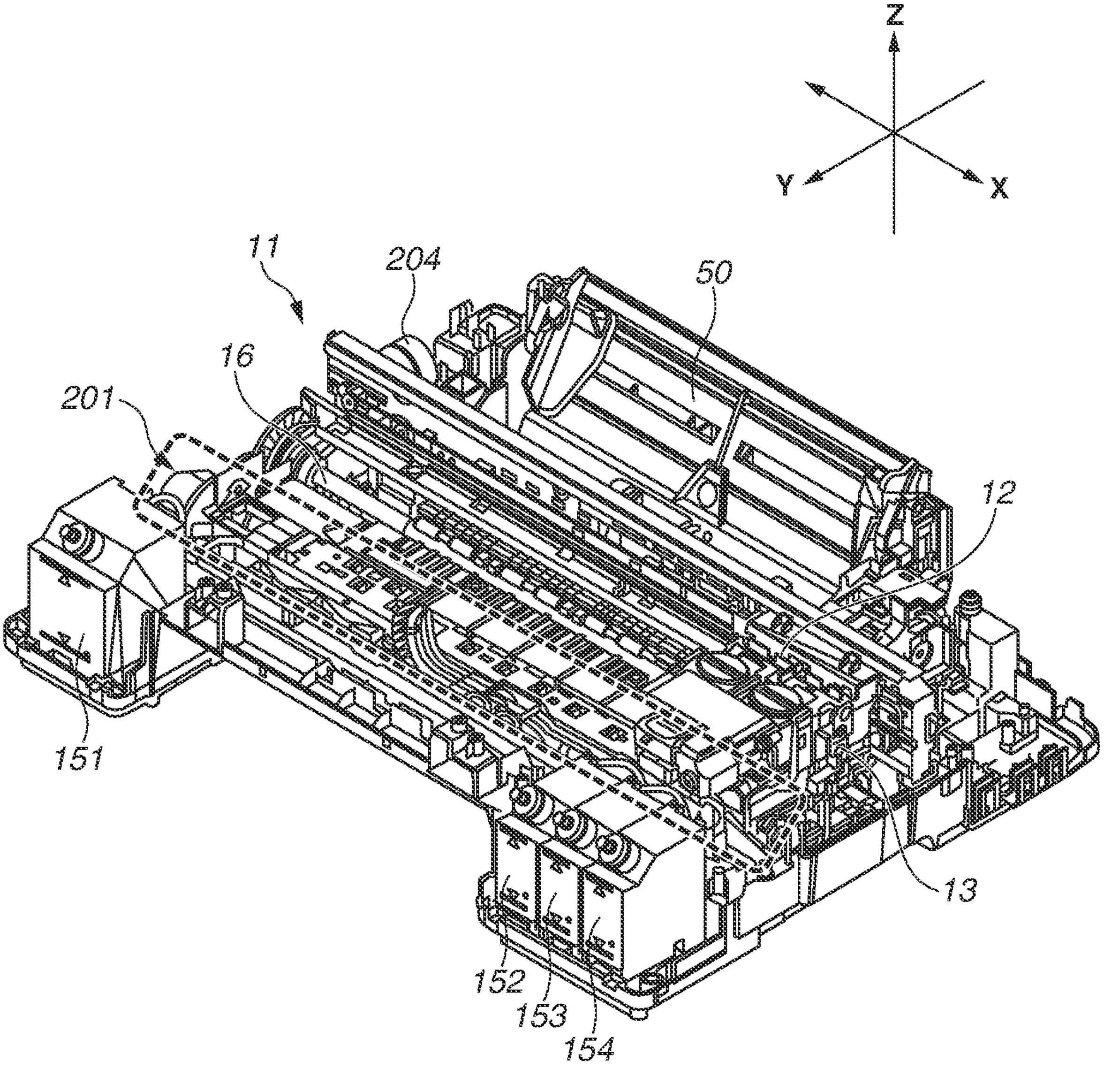
FIG. 2 is a perspective view illustrating an internal configuration of the image recording apparatus according to the first exemplary embodiment.

FIG. 2 is a perspective view illustrating an internal configuration of the recording apparatus 11.

The recording apparatus 11 includes a feeding unit 50 that feeds the recording medium, a conveyance roller 16 that conveys the recording medium, and a conveyance motor 201 as a driving unit that drives the conveyance roller 16. The conveyance roller 16 is driven by the conveyance motor 201 via a gear (not illustrated).

The recording medium is fed from the feeding unit 50 to the inside of the recording apparatus 11. The fed recording medium is conveyed by the conveyance roller 16, and is subjected to a recording operation by a head 13. The recording medium that has undergone recording is discharged from the discharge unit 40 to the outside of the recording apparatus 11.

A carriage 12 is driven by a carriage motor 204, as a driving unit, via a timing belt (not illustrated) while being supported by a main chassis (not illustrated), and moves along a main scanning direction (X-direction) orthogonal to a conveyance direction (Y-direction) of the recording medium. Each of the conveyance motor 201 and the carriage motor 204 may be a direct-current (DC) motor or a stepping motor.

The head 13 is mounted on the carriage 12, ejects ink supplied from the ink tank 15 as ink droplets while moving in the main scanning direction (X-direction), and performs a recording operation to record an image for one band on the recording medium. When the image for one band is recorded on the recording medium, the recording medium is conveyed by the conveyance roller 16 in the conveyance direction (Y-direction) by a predetermined amount (intermittent conveyance operation). By the repetition of the recording operation for one band and the intermittent conveyance operation, an image is recorded on the whole of the recording medium.

The ink tank 15 is separated into ink tanks 151 to 154 that contain ink in respective colors of black, cyan, magenta, and yellow.

Figure 3:
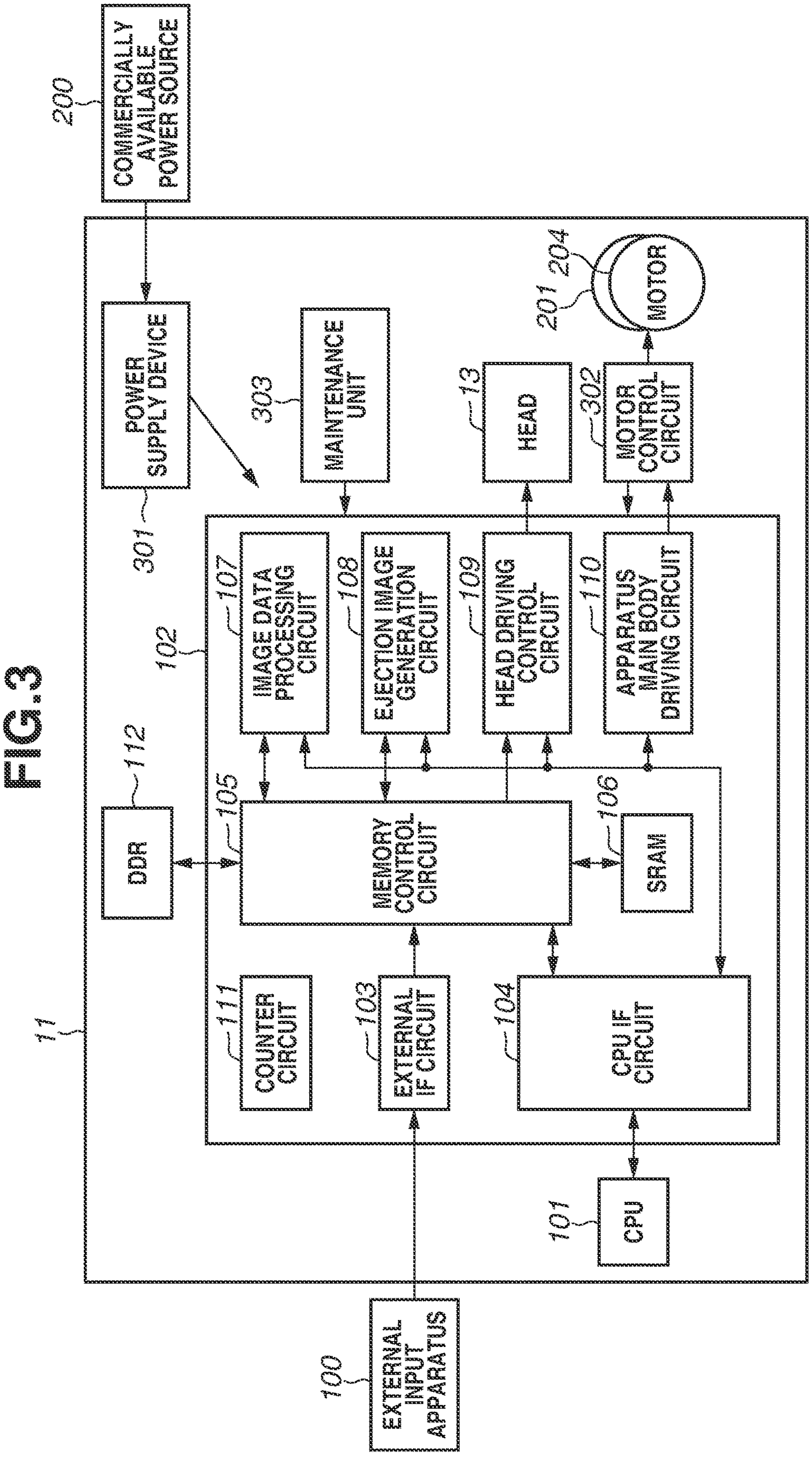
FIG. 3 is a block diagram of the image recording apparatus according to the first exemplary embodiment.

FIG. 3 is a block diagram of the recording apparatus 11.

An application-specific integrated circuit (ASIC) 102 is a control circuit that controls printer-specific hardware, and that controls, for example, recording on the recording medium with the head 13. The ASIC 102 includes a counter circuit 111 as a time measuring unit for controlling hardware, and further includes an external interface (IF) circuit 103, a central processing unit (CPU) IF circuit 104, a memory control circuit 105, a static random-access memory (SRAM) 106, an image data processing circuit 107, an ejection image generation circuit 108, a head driving control circuit 109, and an apparatus main body driving circuit 110.

The external IF circuit 103 is an acquisition unit that performs communication with an external input apparatus 100 arranged outside the recording apparatus 11, such as a personal computer (PC), a hard disk drive (HDD), and a smartphone, and performs communication with each block inside the ASIC 102 to acquire time information, such as a present time and image data. The external IF circuit 103 is, for example, a universal serial bus (USB) interface circuit, a wireless communication interface circuit, a local area network (LAN) interface circuit, an integrated drive electronics (IDE) interface circuit, or the like.

The CPU IF circuit 104 connects a CPU 101 and the ASIC 102, and the CPU 101 performs communication with each block inside the ASIC 102.

The memory control circuit 105 is connected with the external IF circuit 103, the SRAM 106, the image data processing circuit 107, the ejection image generation circuit 108, the head driving control circuit 109, and a digital data receiver (DDR) 112. The memory control circuit 105 transfers image data input from the external input apparatus 100, and also controls readout/writing from/to the SRAM 106 and the DDR 112.

The SRAM 106 is a working buffer, and image data is divided into units of a specific size and stored in the SRAM 106. The ASIC 102 may include SRAMs 106 whose number corresponds to the number of colors of ink to be ejected or the number of nozzles.

The image data processing circuit 107 performs image processing on image data stored in the SRAM 106. The image processing mentioned herein is processing such as boundary processing, edge processing, horizontal-to-vertical (HV) conversion, smoothing, and non-ejection complement processing, but may be other processing.

The ejection image generation circuit 108 converts image data that has undergone image processing into data in a format according to a nozzle of the head 13 (hereinafter referred to as ejection image data).

The head driving control circuit 109 transfers the ejection image data to the head 13, and drives the head 13.

A maintenance unit 303 performs recovery processing to recover the head 13, and corresponds to a recovery unit. Specifically, the maintenance unit 303 includes a cap (not illustrated) that caps an ejection surface of the nozzle of the head 13 and a wiper blade (not illustrated) that wipes the surface of the nozzle.

The DDR 112 is a reception buffer that is arranged outside the ASIC 102, and stores image data subjected to correction processing in the image data processing circuit 107 or the like.

The apparatus main body driving circuit 110 generates a control signal and a power supply control signal each used for driving the conveyance motor 201 or the carriage motor 204, and transfers the control signal and the power supply control signal. The apparatus main body driving circuit 110 also controls a sensor group (not illustrated).

A motor control circuit 302 performs control of the conveyance motor 201 and the carriage motor 204 and power supply control of the whole of the recording apparatus 11 based on control data transferred from the apparatus main body driving circuit 110. The power supply control will be described below.

A power supply device 301 generates DC power from a commercially available power source 200, and supplies necessary power to each unit of the recording apparatus 11.

Two modes of a normal mode and a power-saving mode can be set in the recording apparatus 11. The normal mode is a mode for supplying power necessary for each unit of the recording apparatus 11. For example, the normal mode corresponds to a state where power that enables the head 13 to perform a recording operation is supplied.

The power-saving mode is a mode for supplying power only to the bare minimum portions, and less power is used in the power-saving mode than in the normal mode. The power-saving mode corresponds to a state where a restriction is placed on power supply so that power is supplied to, for example, the motor control circuit 302 as a bare minimum portion, while power supplied to the ASIC 102 is off or is lower than that in the normal mode.

Figure 4:
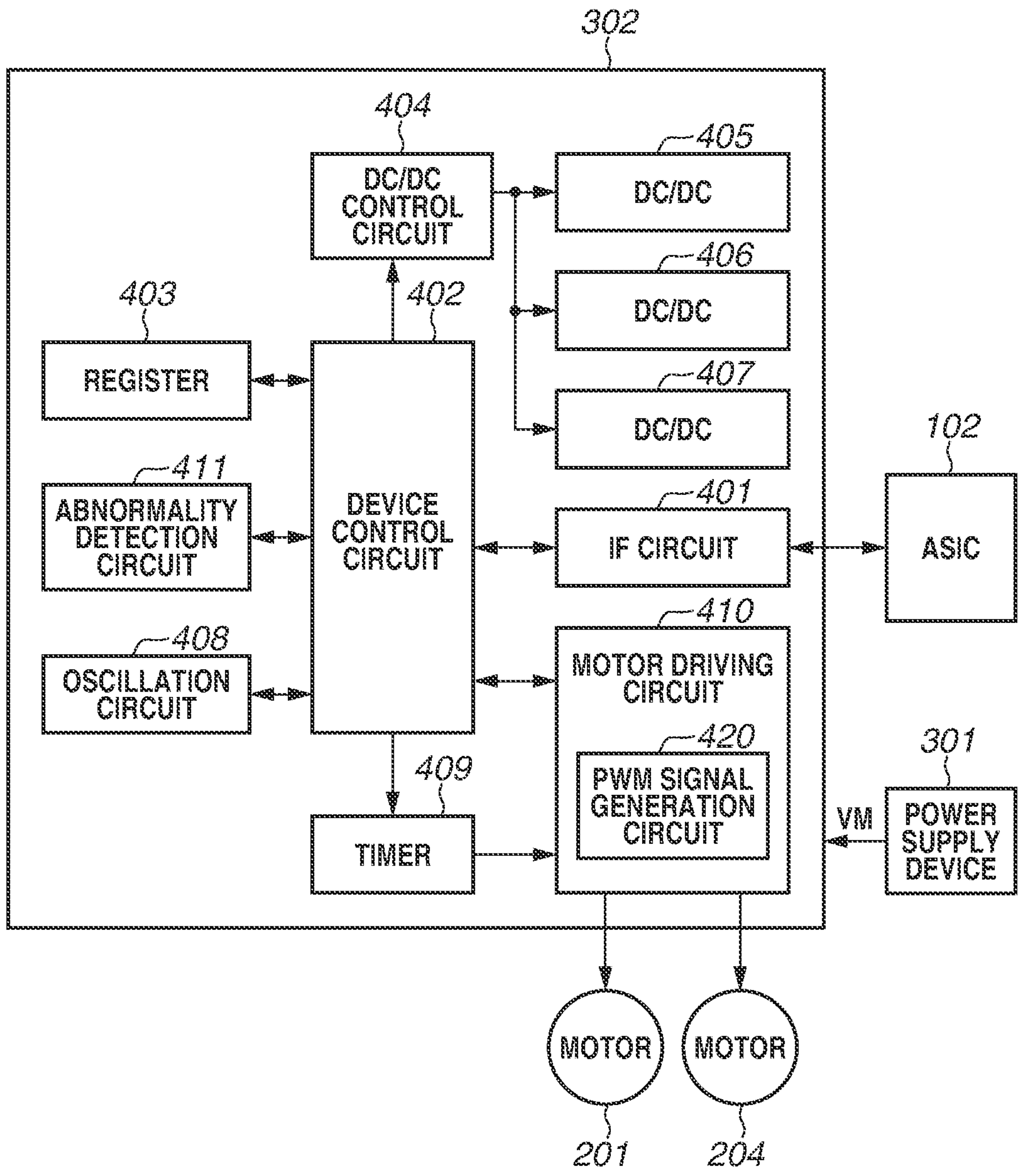
FIG. 4 is a detailed block diagram of a motor control circuit according to the first exemplary embodiment.

FIG. 4 is a detailed circuit diagram of the motor control circuit 302.

The motor control circuit 302 includes an IF circuit 401, a device control circuit 402, a register 403, a DC/DC control circuit 404, DC/DCs 405 to 407, an oscillation circuit 408, a timer 409, a motor driving circuit 410, and an abnormality detection circuit 411.

The IF circuit 401 is connected with the ASIC 102, controls communication with the apparatus main body driving circuit 110 and the device control circuit 402 to transfer control data, and also controls an interrupt to the ASIC 102.

The device control circuit 402 is connected with the IF circuit 401, the register 403, the DC/DC control circuit 404, the oscillation circuit 408, the timer 409, the motor driving circuit 410, and the abnormality detection circuit 411. The device control circuit 402 analyzes the control data transferred thereto from the ASIC 102 via the IF circuit 401, and controls each circuit in the motor control circuit 302.

Settings for operating each circuit are stored in the register 403. For example, a state of controlling each motor, a state of controlling power supply, an internal frequency of the motor control circuit 302, an abnormal state, and the like, are stored in the register 403.

The DC/DC control circuit 404 controls voltages generated in the DC/DCs 405 to 407 based on the control data, a switching frequency, ON/OFF of frequency diffusion (spread spectrum clock generator (SSCG)), ON/OFF of the DC/DCs 405 to 407, and timings of ON/OFF of the DC/DCs 405 to 407.

The DC/DCs 405 to 407 are power supply voltage generation units that generate power supply voltages to components in the recording apparatus 11. For example, the output from the DC/DC 405 generates a power supply V1 at 1.1 V for an internal logic. The output from the DC/DC 406 generates a power supply V3 at 3.3 V for an external I/F circuit, and the output from the DC/DC 407 generates power supplies V5 at 3.3 V and 5.0 V for peripheral circuits.

The oscillation circuit 408 is a circuit that generates an oscillation frequency, and generates a reference frequency at which each circuit in the motor control circuit 302 operates. The reference frequency is generally lower than the frequency in the ASIC 102, and is, for example, at 12 MHz. The reference frequency may be variable.

The timer 409 has a counter function of counting time with a specific period, and an application purpose is changed depending on a mode in the present exemplary embodiment. The timer 409 is, for example, a 28-bit counter.

The timer 409 is a counter that generates a period for driving each motor and counts time based on the period. For example, the timer 409 counts time at every 50 kHz or every 100 kHz. That is, the timer 409 has a role as a generation unit that generates a period for controlling each motor. Meanwhile, in the power-saving mode, the period is changed to a period at 20 Hz (per 50 ms), and the timer 409 measures time during power saving. In a case of measuring time with the 28-bit counter, the timer 409 is capable of counting time up to about 155 days. The measured time can be increased by an increase of a bit number of the counter. However, to measure long time while preventing an increase in cost, the timer 409 preferably measures time by changing the period to a period that is longer than the period used at the time of performing control of each motor as described above.

The motor driving circuit 410 includes a pulse-width modulation (PWM) signal generation circuit 420, which is a circuit for driving the conveyance motor 201 and the carriage motor 204.

The PWM signal generation circuit 420 generates a waveform of a PWM signal based on a counting period of the timer 409 according to a setting generated in the device control circuit 402 based on the control data. The PWM control mentioned herein indicates control of a motor by periodically outputting a pulse wave and changing a period of the pulse wave and a ratio of a pulse width.

In the normal mode, the PWM signal generation circuit 420 generates a periodic pulse wave using the period generated with use of the timer 409. The period of the pulse wave and the pulse width are set based on the control data.

The abnormality detection circuit 411 detects abnormalities, such as overcurrent, an overvoltage, a low voltage, and an abnormal temperature of a chip. In a case of detecting the abnormality, the abnormality detection circuit 411 notifies the ASIC 102 of the abnormality.

A description is now given of power supply control of the DC/DCs 405 to 407 in the normal mode and the power-saving mode with use of the motor control circuit 302.

When a power supply cable for the recording apparatus 11 is plugged into an outlet or the like, the power supply device 301 generates a DC power supply VM from the commercially available power source 200. When the DC power supply VM is applied to the motor control circuit 302, the power supply V1 is generated from the DC/DC 405 and the power supply V3 is generated from the DC/DC 406, whereby a preparation for activating the ASIC 102 is completed. When the ASIC 102 is activated, the power supplies V5 are generated from the DC/DC 407 as necessary depending on a state of the recording apparatus 11, and the peripheral circuits are brought into an operable state. This is the normal mode.

Meanwhile, to make a transition from the normal mode to the power-saving mode, the ASIC 102 and the device control circuit 402 communicate with each other via the IF circuit 401. With the communication, the device control circuit 402 controls the DC/DC control circuit 404 to stop power supplies from the DC/DCs 405 to 407.

An operation flow of the recording apparatus 11 in the power-saving mode is now described with reference to FIG. 5.

In step S501, at the time of the normal mode, the recording apparatus 11 causes the ASIC 102 to start control of making a state transition to the power-saving mode based on a specific factor. The specific factor mentioned herein includes a case where no operation has been performed on the recording apparatus 11 for a specific period of time or a case where no print job has been transmitted to the recording apparatus 11 for the specific period of time.

In step S502, the ASIC 102 acquires time information, which is a time at which the transition is made to the power-saving mode via the external IF circuit 103. Examples of a unit for acquiring the time information from the external input apparatus 100 include acquisition from a personal computer (PC), a network, and an access point via a wireless local area network (WLAN), and acquisition from the PC via a universal serial bus (USB).

In step S503, when the acquisition of the time information has been completed, the ASIC 102 and the motor control circuit 302 start to communicate with each other. Each of control data and the acquired time information is transmitted from the ASIC 102 to the motor control circuit 302. In step S504, the motor control circuit 302 stores the received time information in the register 403.

In step S505, the device control circuit 402 controls the DC/DC control circuit 404 based on the transferred control data to stop output of the DC/DCs 405 to 407. In step S506, the power supply to the ASIC 102 is turned off, and the state transition to the power-saving mode is completed.

In step S507, the device control circuit 402, based on the transferred control data, downclocks the timer 409 to change a counting period of the timer 409 from a period for generating a PWM signal (first period) to a period for measuring time (second period). In step S508, the timer 409 starts counting based on the second period. The second period is longer than the first period. For example, the first period is 0.02 ms, and the second period is 50 ms.

In step S509, the device control circuit 402 determines whether a value counted by the timer 409 (a timer count) is predetermined time or longer. In a case where the timer count is the predetermined time or longer (YES in step S509), the processing proceeds to step S510. In step S510, a temporary transition is made to the normal mode, and the ASIC 102 executes recovery processing to recover the head 13. In the recovery processing mentioned herein, the ASIC 102 executes, in addition to wiping using the maintenance unit 303, flushing to eject a liquid from the head 13 to a cap or other operations. After the recovery processing, the state returns to the power-saving mode again.

In a case where the timer count is shorter than the predetermined time (NO in step S509), or after the recovery processing is executed (in step S510), the processing proceeds to step S511. In step S511, the motor control circuit 302 determines whether a factor for recovery from the power-saving mode has occurred.

In a case where the factor for recovery has occurred (YES in step S511), the transition is made to the normal mode, and the flow ends. In a case where the factor for recovery has not occurred (NO in step S511), the timer 409 continues counting, and the processing returns to step S509. This is repeated until the factor for recovery occurs. Examples of the factor for recovery from the power-saving mode include a case where a power key is pressed and a case where a print job is received.

With this configuration, according to the present exemplary embodiment, the period for counting that is performed by the timer 409 and that is used for controlling each motor is changed and used as the time measuring unit, whereby it is possible to measure time while further enhancing a power saving effect without an additional component or the like.

A second exemplary embodiment is now described. A basic configuration is similar to that of the first exemplary embodiment, and parts different from the first exemplary embodiment are to be described.

The timer 409 measures time for executing a recovery operation during power saving. However, in a case where, for example, an error of several days or an error that is longer than several days occurs and it is determined that the state has been in the power-saving mode in a period of time that is longer than actual elapsed time, the recovery operation is performed more than necessary. Or in a case where it is determined that the state has been in the power-saving mode for a period of time that is shorter than the actual elapsed time, the recovery operation cannot be performed at an appropriate timing.

The present exemplary embodiment is directed to improving the accuracy of time measurement even if there is an error in a timer count, and an operation flow for correcting time measured by the timer 409 will be described with reference to FIG. 6.

Figure 5:
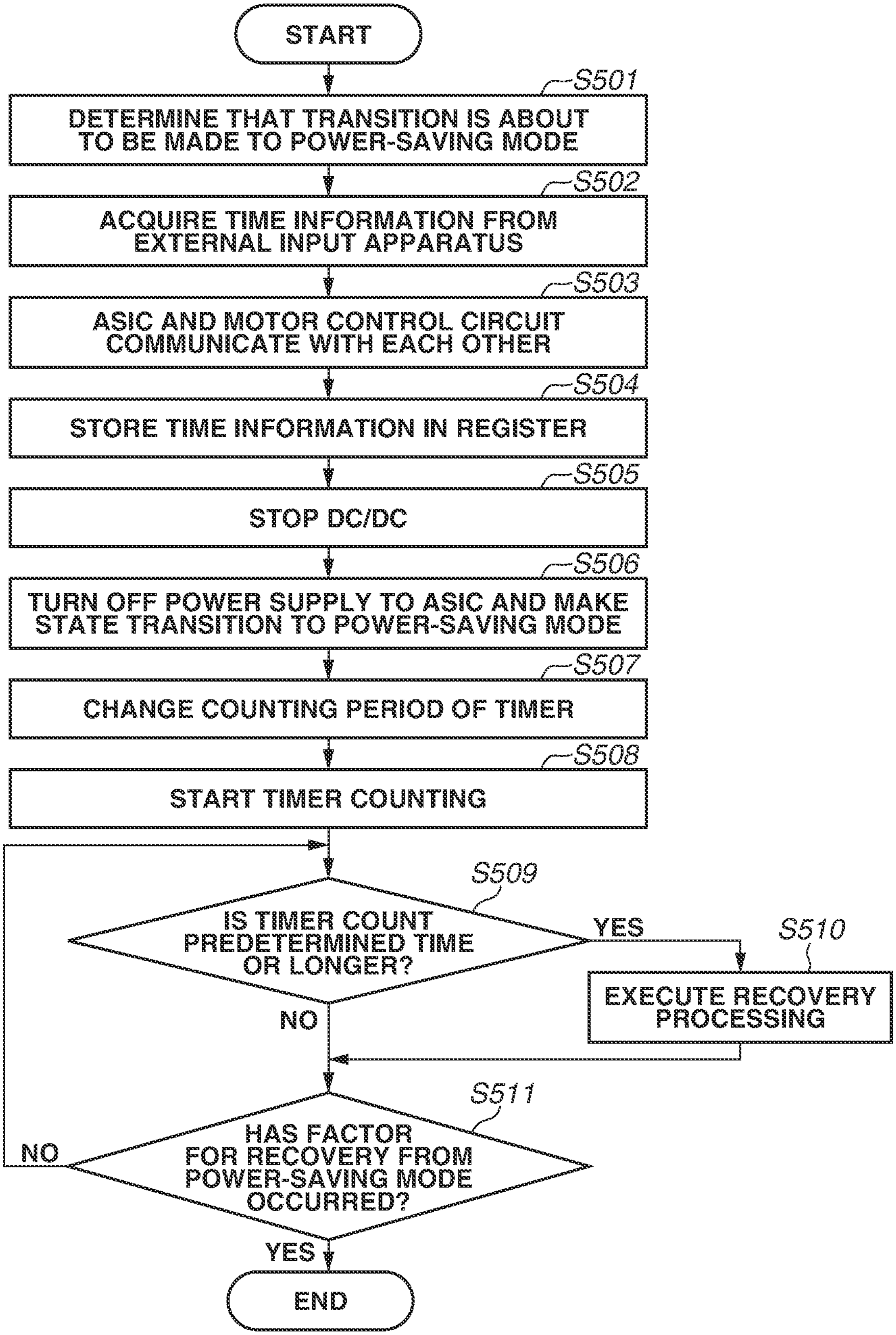
FIG. 5 is a flowchart describing an operation flow of the image recording apparatus according to the first exemplary embodiment.

Because steps S601 to S608 respectively correspond to step S501 to S508 in FIG. 5 and similar control is performed, a description of the steps is omitted.

In step S608, timer counting is started. In step S609, the motor control circuit 302 determines whether a timer count has exceeded specific time during the power-saving mode.

In a case where the timer count has exceeded the specific time (YES in step S609), the processing proceeds to step S610. In step S610, the motor control circuit 302 turns on the DC/DCs 405 to 407 via the DC/DC control circuit 404 to make the transition to the normal mode. In a case where the timer count has not exceeded the specific time (NO in step S609), the processing proceeds to step S617.

In step S611, after the motor control circuit 302 turns on the DC/DCs 405 to 407 in step S610, the ASIC 102 and the motor control circuit 302 communicate with each other, and the ASIC 102 determines that the power supply is turned on to correct the time information based on the control data transferred from the motor control circuit 302.

In step S612, the ASIC 102 acquires present time information from the external input apparatus 100.

In step S613, the ASIC 102 communicates with the motor control circuit 302, and calculates time from the time information acquired when the transition is made to the power-saving mode (the time information acquired in step S604) and the present time information. In step S614, the ASIC 102 compares the calculated time and the timer count measured by the timer 409 (elapsed time). In a case where a difference in time is a predetermined value or more (YES in step S614), the processing proceeds to step S615. In step S615, the ASIC 102 corrects the timer count. In step S616, when the correction of the timer count is completed, the motor control circuit 302 stops the DC/DCs 405 to 407 via the DC/DC control circuit 404, and the processing proceeds to step S617.

In a case where the difference in time is less than the predetermined value (NO in step S614), the processing directly proceeds to step S616.

In step S617 subsequent to step S616, the motor control circuit 302 determines whether the timer count becomes a predetermined value or more. In a case where the timer count becomes the predetermined value or more (YES in step S617), the processing proceeds to step S618. In step S618, the motor control circuit 302 turns on the DC/DCs 405 to 407 to make the transition to the normal mode, and the ASIC 102 executes recovery processing to recover the head 13.

In a case where the timer count is less than the predetermined value after the recovery processing is completed (NO in step S617), the processing proceeds to step S619. In step S619, the motor control circuit 302 determines whether the factor for recovery from the power-saving mode has occurred.

In a case where the factor for recovery has occurred (YES in step S619), the motor control circuit 302 turns on the DC/DCs 405 to 407 to make the transition to the normal mode, and the flow ends. In a case where the factor for recovery has not occurred (NO in step S619), the processing returns to step S609.

In a case where the timer count has not exceeded the specific time in the above-mentioned step S609 (NO in step S609), the processing proceeds to the above-mentioned step S617, and similar processing is performed.

With this configuration, in the present exemplary embodiment, correcting the elapsed time measured by the timer 409 based on the time information acquired from the external input apparatus 100 enables improvement of the accuracy in time measurement during the power-saving mode.

While the inkjet-type recording apparatus 11 has been described as an example in the above-mentioned exemplary embodiments, the recording apparatus 11 may be of another type.

The conveyance motor 201 and the carriage motor 204 have been described above as an example, but some embodiments are not limited to the example and may employ a motor for another application purpose.

While the transition is made to the normal mode (the state where the recording operation can be executed) by turning on the DC/DCs 405 to 407, the transition is not necessarily made to the normal mode. For example, power may be supplied to only functions necessary for correction of the elapsed time and the recovery processing, such as the ASIC 102, the external IF circuit 103, and the maintenance unit 303, as necessary.

The DC/DC control circuit 404 included in the motor control circuit 302 performs power supply control in the present exemplary embodiment, but may be arranged independently of the motor control circuit 302.

The maintenance unit 303 may include, in addition to the cap and the wiper blade, a suction mechanism (pump or the like) that sucks ink in the nozzle or ink ejected from the nozzle, and may perform suction using the suction mechanism as the recovery processing.

The configuration of the DC/DCs 405 to 407 is one example, and a type of a generated voltage and the number of DC/DCs are not limited to this configuration.

The correction of the elapsed time measured by the timer 409 and the acquisition of the time information via the external IF circuit 103 may be performed by the motor control circuit 302, instead of the ASIC 102.

In the above-mentioned exemplary embodiment, the timer count is corrected in a case where the difference between the elapsed time measured by the timer 409 and the time calculated from the time information acquired from the external input apparatus 100 is the predetermined value or more. However, the timer count may be corrected regardless of an amount of the difference.

Figure 6:
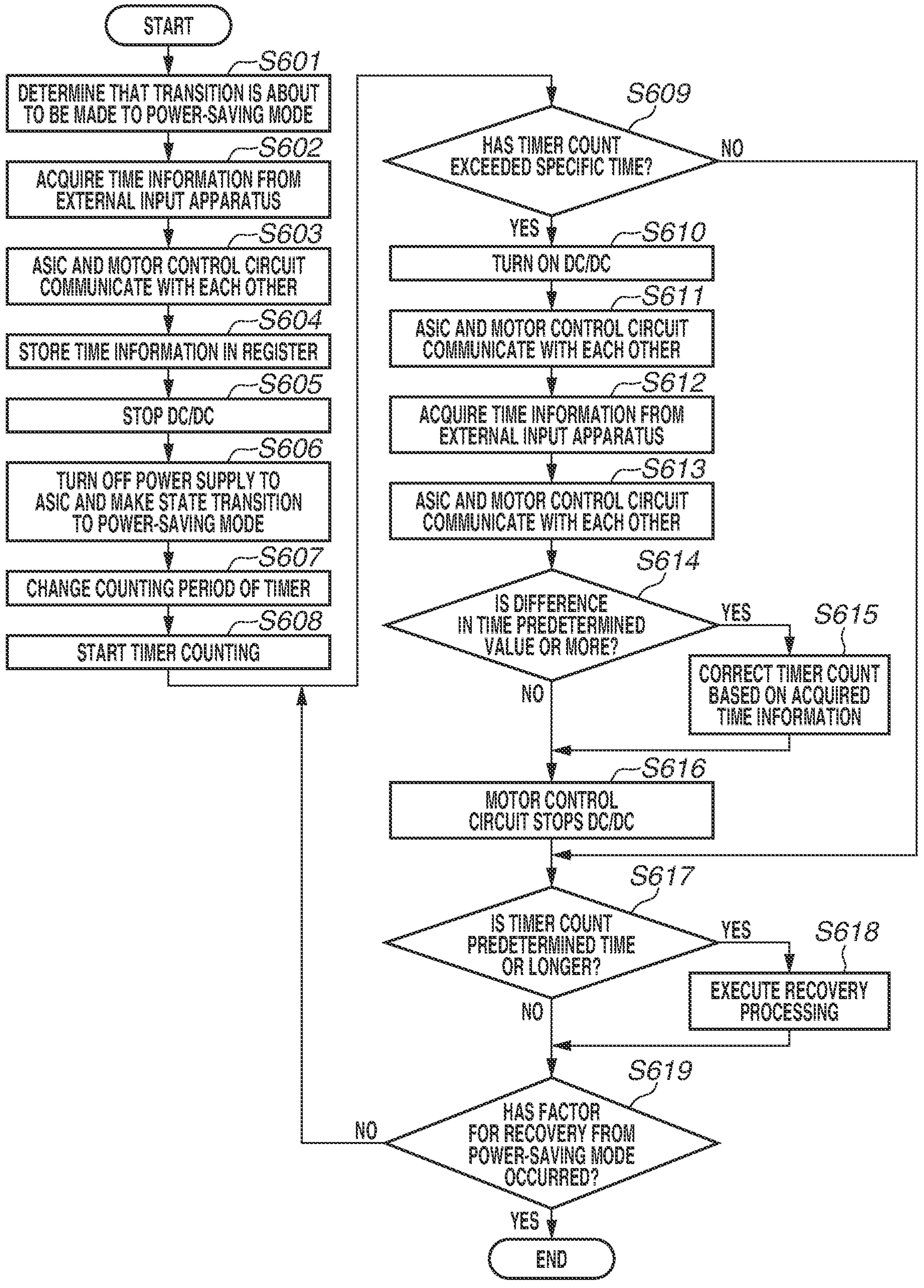
FIG. 6 is a flowchart describing an operation flow of the image recording apparatus according to a second exemplary embodiment.

A timing of return to the normal mode due to the occurrence of the factor for recovery is not limited to the timing described in FIG. 5 or 6. The factor for recovery may be constantly monitored during the power-saving mode and the transition to the normal mode may be made upon occurrence of the factor for recovery.

The predetermined time measured by the timer 409 as the timing of performing the recovery processing and the specific time as the timing of correcting the timer count may not be fixed and may be changed depending on a state.

In the above-mentioned exemplary embodiment, the recovery processing is executed in a case where the timer count becomes the predetermined time or longer, but the elapse of the predetermined time may be stored as a flag. After the return to the normal mode due to the occurrence of the factor for recovery, the recovery processing may be executed with reference to the flag.

When the timer count is corrected, the correction may be made using a time acquired from the external input apparatus 100 multiple times during the power-saving mode.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-071898, which was filed on Apr. 25, 2023 and which is hereby incorporated by reference herein in its entirety.

What is claimed is:

1. An image recording apparatus comprising:

a driving control circuit configured to record an image on a recording medium;

a timer circuit configured to operate at a first counting frequency used to generate a timing signal for controlling the driving control circuit; and a control circuit configured to control the timer circuit, wherein, in response to a transition from a normal mode in which the image is recorded to a power-saving mode that uses less power than the normal mode, the control circuit is configured to change a counting frequency of the timer circuit from the first counting frequency to a second counting frequency lower than the first counting frequency, and, in the power-saving mode, the timer circuit is configured to count elapsed time based on the second counting frequency.

2. The image recording apparatus according to claim 1, wherein the control circuit is further configured to control the image recording apparatus, and wherein the control circuit includes a counter configured to measure time, and the control circuit is configured to use the counter to measure time in the normal mode.

3. The image recording apparatus according to claim 2, wherein, in the power-saving mode, a restriction is placed on power supplied to the control circuit, and the counter is configured to stop measuring time.

4. The image recording apparatus according to claim 3, wherein the control circuit is an application-specific integrated circuit (ASIC).

5. The image recording apparatus according to claim 1, further comprising:

a conveyance motor configured to convey the recording medium, or a carriage motor configured to move a head configured to record an image.

6. The image recording apparatus according to claim 1, further comprising an interface circuit configured to acquire time information, wherein the elapsed time counted based on the second counting frequency is corrected based on the time information acquired by the interface circuit.

7. The image recording apparatus according to claim 6, wherein the time information includes a time at which a transition is made from the normal mode to the power-saving mode, or a time at which a specific period of time has elapsed in the power-saving mode.

8. The image recording apparatus according to claim 6, wherein the interface circuit is configured to acquire the time information in the normal mode, and thereafter a transition is made from the normal mode to the power-saving mode.

9. The image recording apparatus according to claim 1, further comprising:

a head configured to record an image; and a cap and a wiper configured to recover a function of the head, wherein the cap and the wiper are configured to operate based on the elapsed time counted based on the second counting frequency.

10. The image recording apparatus according to claim 1, wherein a pulse width modulation (PWM) signal to control the driving control circuit is generated based on the first counting frequency.

11. A method of controlling an image recording apparatus, comprising:

performing driving to record an image on a recording medium;

counting, by a timer circuit, at a first counting frequency to control the driving;

in response to a transition from a normal mode in which the image is recorded to a power-saving mode that uses less power than the normal mode, changing a counting frequency of the timer circuit from the first counting frequency to a second counting frequency lower than the first counting frequency; and in the power-saving mode that uses less power than the normal mode in which the image is recorded, counting elapsed time by the timer circuit at the second counting frequency.

* * * * *